United States Patent [19]

Brooks

[11] Patent Number: 5,564,193
[45] Date of Patent: Oct. 15, 1996

[54] METHOD OF CORRECTING FOR AXIAL AND TRANSVERSE ERROR COMPONENTS IN MAGNETOMETER READINGS DURING WELLBORE SURVEY OPERATIONS

[75] Inventor: Andrew G. Brooks, Tomball, Tex.

[73] Assignee: Baker Hughes Incorporated, Houston, Tex.

[21] Appl. No.: 551,937

[22] Filed: Oct. 23, 1995

Related U.S. Application Data

[63] Continuation of Ser. No. 154,200, Nov. 17, 1993, abandoned.

[51] Int. Cl.$^6$ ............................................. E21B 47/022
[52] U.S. Cl. ........................ 33/302; 33/304; 33/313
[58] Field of Search ........................ 33/302, 304, 310, 33/313, 301, 303

[56] References Cited

U.S. PATENT DOCUMENTS

| | | |
|---|---|---|
| Re. 33,708 | 10/1991 | Roesler . |
| 2,593,070 | 4/1952 | Stuart, Jr. . |
| 3,587,175 | 6/1971 | Armistead . |
| 3,753,296 | 8/1973 | Van Steenwyk . |
| 3,791,043 | 2/1974 | Russell . |
| 3,862,499 | 1/1975 | Isham et al. . |
| 3,896,412 | 7/1975 | Rohr . |
| 3,935,642 | 2/1976 | Russell . |
| 4,021,774 | 5/1977 | Asmundsson et al. . |
| 4,071,959 | 2/1978 | Russell et al. . |
| 4,083,117 | 4/1978 | Russell et al. . |
| 4,163,324 | 8/1979 | Russell et al. . |
| 4,174,577 | 11/1979 | Lewis . |
| 4,199,869 | 4/1980 | Van Steenwyk . |
| 4,345,454 | 8/1982 | Brown . |
| 4,414,753 | 11/1983 | Moulin et al. . |
| 4,433,491 | 2/1984 | Ott et al. . |
| 4,472,884 | 9/1984 | Engebretson . |
| 4,510,696 | 4/1985 | Roesler . |
| 4,559,713 | 12/1985 | Ott et al. . |
| 4,637,480 | 1/1987 | Obrecht et al. . |
| 4,649,349 | 3/1987 | Chiron et al. . |
| 4,682,421 | 7/1987 | van Dongen et al. . |
| 4,709,486 | 12/1987 | Walters . |
| 4,761,889 | 8/1988 | Cobern et al. . |
| 4,813,214 | 3/1989 | Barnard et al. . |
| 4,813,274 | 3/1989 | DiPersio et al. . |
| 4,819,336 | 4/1989 | Russell . |
| 4,836,301 | 6/1989 | Van Dongen et al. . |
| 4,875,014 | 10/1989 | Roberts et al. . |
| 4,894,923 | 1/1990 | Cobern et al. . |
| 4,956,921 | 9/1990 | Coles . |
| 4,999,920 | 3/1991 | Russell et al. . |
| 5,012,412 | 4/1991 | Helm . |
| 5,034,929 | 7/1991 | Cobern et al. . |
| 5,103,177 | 4/1992 | Russell et al. . |
| 5,155,916 | 10/1992 | Engebretson . |
| 5,321,893 | 6/1994 | Engebretson ............................. 33/304 |

FOREIGN PATENT DOCUMENTS

| | | |
|---|---|---|
| 193230 | 8/1985 | European Pat. Off. . |
| 1240830 | 7/1971 | United Kingdom . |
| 1578053 | 10/1980 | United Kingdom . |
| 2086055 | 5/1982 | United Kingdom . |
| 2122751 | 1/1984 | United Kingdom . |
| 2138141 | 10/1984 | United Kingdom . |
| 2158587 | 11/1985 | United Kingdom . |
| 2185580 | 7/1987 | United Kingdom . |
| 2256492 | 12/1992 | United Kingdom ..................... 33/302 |

OTHER PUBLICATIONS

Encyclopedia Britannica, "Geomagnetism", vol. 10, 1960, p. 171.

Composite Catalog of Oil Field Equipment and Services, vol. 3, 1974–1975.

Alfred Hine, B.Sc., "Magnetic Compasses and Magnetometers", 1968, pp. 1–7, 105–107.

A. C. Scott, et al, "Determining Downhole Magnetic Interference on Directional Surveys," Society of Petroleum Engineers, 1979.

C. J. M. Wolf, et al, "Borehole Position Uncertainty–Analysis of Measuring Methods and Derivation of Systematic Error Model", Journal of Petroleum Technology, Dec., 1981, pp. 2339–2350.

J. Edwards F. Pernet, et al, "Magnetic Properties of Nonmagnetic Drill Collars and Their Relation to Survey Compass Error", Geoexploration, 1979, pp. 229–241.

T. G. Thometz, "Determining Non-Magnetic Survey Collar Requirements", World Oil, vol. 182, No. 6, May 1976, pp. 79–80.

B. J. S. Deo, "An Analysis of the Angles of Rotation and Azimuth Using M.W.D.", Gearhart Geodata Services, Ltd. (no date).

C. A. Johancsik, et al, "Application of Measurement While Drilling in a Shallow, Highly Deviated Drilling Program", Energy, Science and Technology, Jun. 1984, pp. 521–531.

*Primary Examiner*—William A. Cuchlinski, Jr.
*Assistant Examiner*—G. Bradley Bennett
*Attorney, Agent, or Firm*—Melvin A. Hunn; Felsman, Bradley, Gunter & Dillon

[57] ABSTRACT

A method is disclosed for determining wellbore azimuth accurately, notwithstanding the corrupting influence of axial and transverse magnetic field biasing error components.

A reliable value of the axial magnetic field component ($B_x$) is determined by minimizing the vector distance between B (as measured) and its expected value $\underline{B}$. Preferably, this is accomplished utilizing a method of radicals to solve a quadratic equation.

Given a reliable $B_x$, the transverse magnetic field components ($B_x$ and $B_x$) can be determined from taking a number of surveys as the drillstring is rotated about. $B_x$ and $B_x$ can be determined by utilizing the assumption that the transverse magnetic field components should remain invariant as the drillstring is rotated.

12 Claims, 4 Drawing Sheets

METHOD OF CORRECTING FOR AXIAL AND TRANSVERSE ERROR COMPONENTS IN MAGNETOMETER READINGS DURING WELLBORE SURVEY OPERATIONS

This application is a continuation of application Ser. No. 08/154,200 filed Nov. 17, 1993, now abandoned.

BACKGROUND OF THE INVENTION

1. Field of the Invention

The present invention relates in general to survey operations in an oil and gas wellbore, and in particular relates to techniques for compensating for biased magnetometer measurements in the determination of azimuth.

2. Description of the Prior Art

In order to understand the present invention, it is important to establish the definitions of terminology utilized in wellbore survey operations. Surveys are used to determine the position of a wellbore within the earth. The orientation of the wellbore is determined at a particular depth by the deviation of the wellbore from a predetermined axis. The deviations may be measured with respect to two reference vectors:

(1) the earth's gravitational field vector "G"; and (2) the earth's magnetic field vector "B".

In accordance with this convention, G is positive in the vertical downward direction, while B is positive in the north direction and is inclined by a dip angle D below the horizon, as is shown in FIG. 1.

The position of the wellbore relative to the earth's gravitational field vector G is identified as an inclination "I" angle, which is the angle between the longitudinal axis of the drillstring and the earth's gravitational field vector G. The position of the wellbore relative to the earth's magnetic field vector B and the earth's gravitational field G is identified as a magnetic azimuth "A", which is the angle between the horizontal component of the longitudinal axis of the drillstring and the horizontal component of the earth's magnetic field vector B.

Wellbore survey operations are also frequently utilized to determine the dip angle "D", which is the complement of the angle between the earth's magnetic field vector B and the earth's gravitational field vector G (that is, 90 degrees less the angle between vectors B and G). The dip angle D is available in look-up tables, computer programs, and charts for all latitudes and longitudes on the earth's surface.

In conventional wellbore survey operations, accelerometers are utilized to measure the direction of the earth's gravitational field vector G, and magnetometers are utilized to measure the earth's magnetic field vector B. Each vector includes x-axis, y-axis, and z-axis components.

In order to understand the techniques of the present invention for compensating for the magnetic field biasing error "e", it is important first to understand the coordinate systems utilized in surveying operations. FIG. 2 provides a view of the Cartesian coordinate system which is established relative to the bottomhole assembly of a drillstring. The z-axis of the coordinate system is in alignment with longitudinal axis of the bottom hole assembly. The x-axis and y-axis are perpendicular to the z-axis, and are fixed in position with respect to the bottom hole assembly. Therefore, rotation of the bottomhole assembly about the z-axis also rotates the x-axis and the y-axis by an amount measured in terms of tool face angle "T". Note that the inclination angle I provides a measure of the position of the bottomhole assembly of a drillstring relative to the gravity field vector G, and the tool face angle T provides a measure of the angle in the xy-plane between the y-axis and the highside HS of the tool.

During survey operations, magnetometer readings are taken along the three axes to determine the magnetic field vector B components: these measurements are identified as $B_x$, $B_y$, and $B_z$. Accelerometer readings are taken along the three axes to determine the gravitational field vector G components: these measurements are identified as $G_x$, $G_y$, and $G_z$. Since these vectors have both a direction and a magnitude, these tri-axial measurements will have to be scaled, or calibrated, to accurately reflect the magnitude of the vector they represent.

Survey tools utilize these x-y-z arrays of accelerometers and magnetometers to determine the directions and magnitudes of the B and G vectors in the x-y-z frame of reference. This information is used to determine the tool's "attitude", expressed by the inclination angle I, and the azimuth angle A and the tool face angle T.

Once a set of values for $B_x$, $B_y$, $B_z$, $G_x$, $G_y$, and $G_z$ are determined for a specific wellbore depth, the azimuth A, inclination I, and tool face angle T of the wellbore at that depth can be determined. Also, the value of the magnetic dip angle D can be calculated. An expected magnetic dip angle D can be looked up in reference tables, computer programs, or charts based on the wellsite's longitude and latitude. The three accelerometers are normally used to find I, T and G, the magnetometers are used to find B, and a combination of measurements from all sensors are required to calculate A and D.

Once the azimuth A and inclination I are determined for the wellbore at a number of specific depths, a directional map of the wellbore can be plotted. This directional map shows how far, and in what direction, the wellbore is deviated from the vertical and magnetic north, and ultimately where the well is bottomed.

In order to provide the greatest accuracy in magnetic field measurements, the wellbore surveying tool is typically housed in a non-magnetic subassembly. Additionally, surrounding subassemblies may also be constructed of a non-magnetic material. However, the drillstring, including these non-magnetic subassemblies, can nonetheless become magnetized during drilling operations, to such an extent that the accuracy of the magnetic field measurements is severely impaired. Any magnetization of the bottomhole assembly in the vicinity of the surveying equipment will introduce a biasing error "e", which is an undesired error component contained in magnetometer readings due to the magnetization of the drillstring. The biasing error includes the following two types of error components:

(1) an axial biasing error $e_z$; and (2) a transverse (or "cross-axial") biasing error $e_{xy}$.

Since the biasing error $e_z$ and $e_{xy}$ arise from sources fixed to the subassembly which carries the sensor array, the transverse biasing error $e_{xy}$ is fixed in position relative to the x-y-z frame of reference and will rotate as the tool is rotated. In other words, the transverse biasing error $e_{xy}$ will remain invariant as the tool is rotated.

In the prior art, there are a plurality of methods for determining wellbore azimuth A which eliminate or minimize the influence of magnetic field biasing errors, including axial biasing errors $e_z$, and transverse biasing errors $e_{xy}$, but most of the prior art solutions are directed to the minimization or elimination of the axial biasing error $e_z$. Only the approach of U.S. Pat. No. 4,682,421 to van Dongen and U.S. Pat. No. 4,345,454 to Coles are directed to the minimization or elimination of both the axial biasing error $e_z$ and the transverse biasing error $e_{xy}$.

Most of the prior art approaches require either (1) the adoption of an assumption about the value of one component of the earth's magnetic field such as magnetic field strength B, dip angle D, the horizontal component of the magnetic field $B_h$ or the vertical component of the magnetic field $B_v$, or (2) the adoption of an assumption about the value of two components of the earth's magnetic field in combination with an initial estimation of azimuth which is improved through iterative calculations performed upon survey data, with the goal of converging upon a correct solution. These iterative approaches require additional processing resources, slow down the determination of wellbore orientation parameters such as azimuth A, and are subject to convergence to an incorrect or inadequate conclusion. All of the iterative processes require a good initial estimate in order to provide good survey data.

SUMMARY OF THE INVENTION

It is one objective of the present invention to provide a method of surveying a wellbore utilizing a sensor array located within a drillstring within the wellbore, which utilizes measurements from the sensor array to calculate directly, algebraically, and noniteratively wellbore azimuth A.

It is another objective of the present invention to provide a method of surveying a wellbore utilizing a sensor array located within a drillstring within the wellbore, which utilizes one algebraic and noniterative technique for eliminating the influence of the transverse magnetic field biasing error, and a separate algebraic and noniterative technique for eliminating the influence of the axial component of the magnetic field biasing error, from at least one wellbore orientation indicator which establishes wellbore position relative to the earth's magnetic field.

These objectives are achieved as is now described. The present invention is directed to a method of surveying a wellbore utilizing a sensor array which is located within a drillstring which is disposed within the wellbore. During pauses in the drilling operations, the sensor array is utilized to measure the x-axis, y-axis, and z-axis components of both the earth's magnetic and gravitational fields at a particular depth in the wellbore, and at a particular tool face orientation. The drillstring is angularly displaced to at least one other tool face orientation, and additional measurements of the x-axis, y-axis, and z-axis components of the earth's magnetic and gravitational fields are made again with the sensor array at that particular tool face orientation. Then, the various measurements of the magnetic and gravitational fields are utilized to calculate directly, algebraically, and noniteratively at least one wellbore orientation indicator, such as magnetic azimuth A, which establishes a wellbore's position relative to the earth's magnetic field, in a manner which eliminates the influence of the magnetic field biasing errors, including the axial magnetic field biasing error $e_z$, and the transverse magnetic field biasing error $e_{xy}$.

In accordance with the preferred embodiment of the present invention, the influence of the transverse magnetic field biasing error $e_{xy}$ is eliminated by calculating, for each particular depth, at least one intermediate variable which is dependent upon at least a portion of the measurements of the magnetic and gravitational fields, but which is independent of at least one component (in particular, the transverse component) of the magnetic field biasing error. In the preferred embodiment, these intermediate variables comprise $B_{xy}$, which is the x-y plane component of the magnetic field, and $\phi$, which is defined as the difference between the magnetic tool face angle M and the tool face angle T; this is identical to the angle in the xy-plane between magnetic north N and the highside HS of the tool. In accordance with the preferred embodiment of the present invention, a statistical error-minimizing operation, such as a method-of-least-squares estimation, is performed upon the survey data to fit data from two or more surveys to the criteria that $e_x$, $e_y$, $B_{xy}$, and $\phi$ should remain invariant during rotation. The results of this method-of-least-squares estimation are utilized to directly and algebraically calculate the intermediate variables and at least one wellbore orientation indicator (such as azimuth A) which is uninfluenced by the transverse component of the magnetic field biasing error. The values of the transverse biases $e_x$, $e_y$ can also be determined.

In accordance with the preferred embodiment of the present invention, calculations are performed to calculate directly, algebraically, and noniteratively wellbore orientation indicators, which establish wellbore position relative to the earth's magnetic field, such as azimuth A, which are free of the axial magnetic field biasing error $e_z$. In accordance with this technique, the sensor array is utilized to measure the earth's magnetic and gravitational fields at a particular depth and at a particular tool face orientation, or at a particular depth and a plurality of tool face orientations. The measurements of the magnetic and gravitational fields are utilized to calculate directly, algebraically, and noniteratively at least one wellbore orientation indicator, which establishes wellbore position relative to the earth's magnetic field, which is free of the axial component $e_z$ of the magnetic field biasing error. Preferably, the calculations include a comparison of the measurements of the magnetic field with expected values for the magnetic field, in a manner which optimizes the accuracy of a calculated value for the at least one wellbore orientation indicator. More specifically, the measurements of the earth's magnetic field vector magnitude and the dip angle are compared to expected values for the magnetic field vector magnitude and dip angle (or to the values of the expected horizontal component $\underline{B}_h$, and expected vertical component $B_v$, of the earth's magnetic field) in a manner which optimizes accuracy. Preferably, a noniterative method of radicals is employed to obtain two or four real roots which satisfy a particular equation. The root which minimizes the difference between the actual magnetic field values and expected magnetic field values is assumed to be the correct value, and is utilized for calculating the at least one wellbore orientation indicator.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
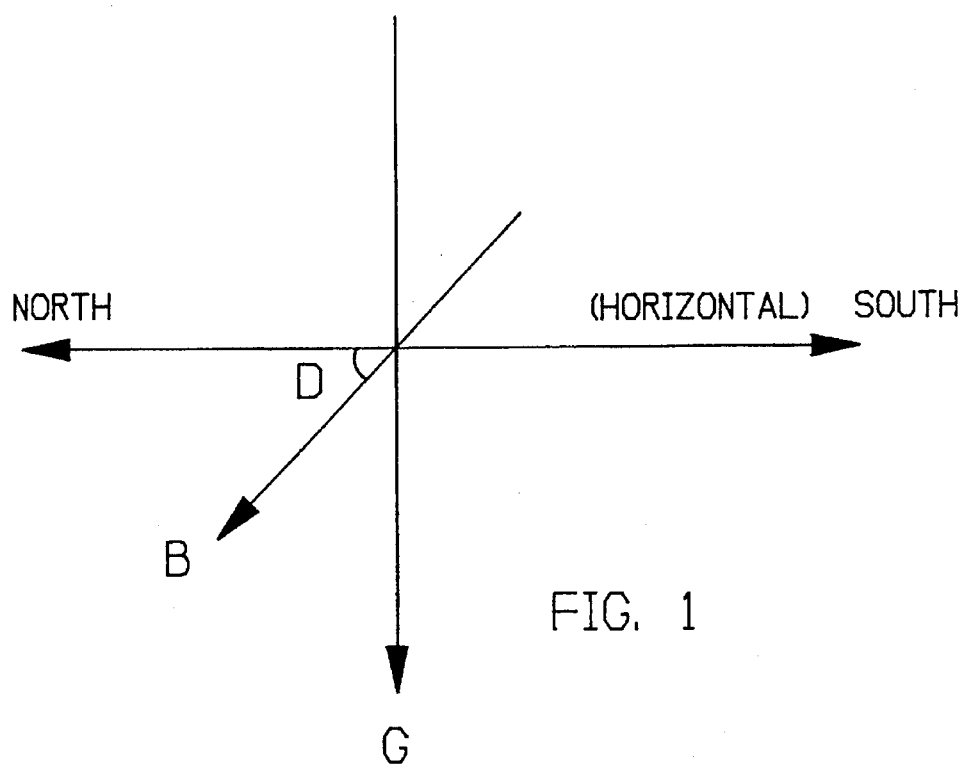
FIG. 1 is a simplified graphical depiction of the earth's field vectors.

The present invention relates to the directional surveying of boreholes using arrays of magnetometers and accelerometers. The surveying tool measures three orthogonal components of the earth's gravity field G and its magnetic field B. G is positive in the vertical downward direction, while B is positive in the north direction and is inclined by a dip angle D below the horizon. These field vectors are illustrated in FIG. 1.

Figure 2:
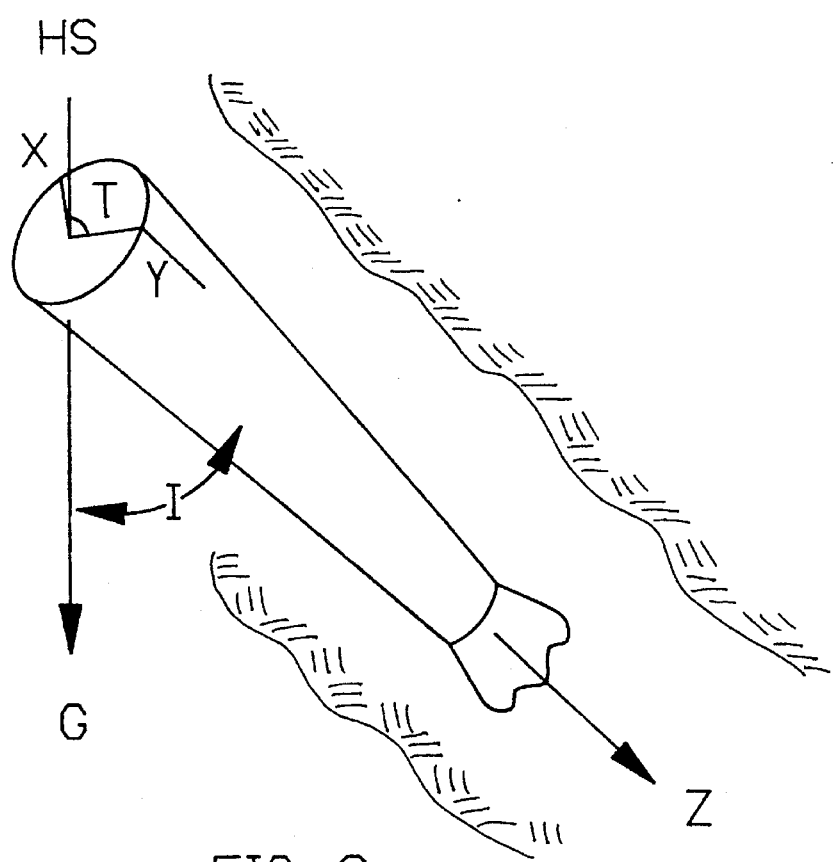
FIG. 2 provides a view of the Cartesian coordinate system which is established with reference to the longitudinal axis of a drillstring disposed within a wellbore.

The three measured components of each field are subscripted x, y, and z. The z-direction is parallel to the longitudinal axis of the drilling tool, pointing toward the drill bit and assumed to be approximately tangent to the borehole. The x- and y-directions are perpendicular to each other and to the z-direction, forming a right-handed triad, the y-direction being aligned with a scribe mark on the survey tool. These tool coordinate axes are shown in FIG. 2.

Figure 3:
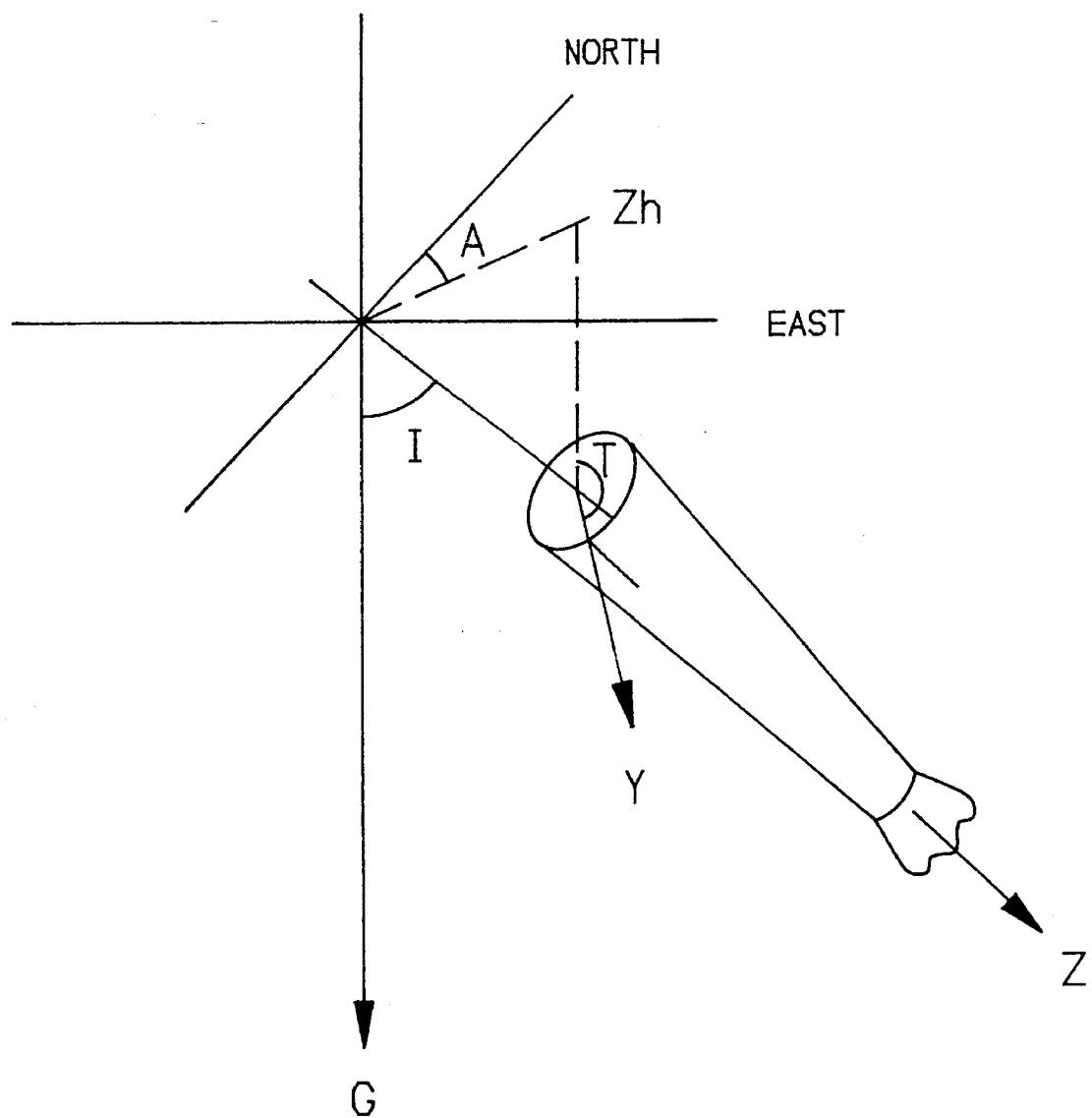
FIG. 3 provides a graphical view of the azimuth, inclination, and tool face angles relative to the coordinate system.

The tool orientation is usually expressed in terms of the following three drilling angles: inclination I which is the angle between the z-direction and vertical; azimuth A which is the angle between the horizontal projections of the z-axis and the magnetic north vector; and gravity tool face T which is the angle in the xy-plane between the high side HS of the tool and the y-axis. FIG. 3 shows these drilling angles. A further drilling angle is the magnetic tool face angle M, defined here as the angle in the xy-plane between magnetic north N and the y-axis. It is instructive to note here that the difference $\phi$ between angle M and angle T is the angle in the xy-plane between magnetic north N and high side HS, which must remain invariant as the tool is rotated about its z-axis.

The components measured by the tool may be expressed as:

$$G_x = G \cdot \sin I \cdot \sin T \quad (1)$$

$$G_y = G \cdot \sin I \cdot \cos T \quad (2)$$

$$G_z = G \cdot \cos I \quad (3)$$

$$B_x = B \cdot \cos D \cdot \cos I \cdot \cos A \cdot \sin T - B \cdot \sin D \cdot \sin I \cdot \sin T + B \cdot \cos D \cdot \sin A \cdot \cos T \quad (4)$$

$$B_y = B \cdot \cos D \cdot \cos I \cdot \cos A \cdot \cos T - B \cdot \sin D \cdot \sin I \cdot \cos T - B \cdot \cos D \cdot \sin A \cdot \sin T \quad (5)$$

$$B_z = B \cdot \cos D \cdot \sin I \cdot \cos A + B \cdot \sin D \cdot \cos I \quad (6)$$

Note that by convention $G_x$ and $G_y$ are defined as positive toward the tool, while the other four measurements are positive away from the tool.

If the measurements are unbiased, the field parameters and drilling angles may be readily determined from the measured components as follows:

$$G = (G_x^2 + G_y^2 + G_z^2)^{0.5} \quad (7)$$

$$I = \cos^{-1}(G_z/G) \quad (8)$$

$$T = \tan^{-1}(G_x/G_y) \quad (9)$$

$$M = \tan^{-1}(B_x/B_y) \quad (10)$$

$$B = (B_x^2 + B_y^2 + B_z^2)^{0.5} \quad (11)$$

$$D = \sin^{-1}[(B_z \cdot G_z - B_x \cdot G_x - B_y \cdot G_y)/(B \cdot G)] \quad (12)$$

$$A = \tan^{-1}[\{G \cdot (\cdot B_x \cdot G_y - B_y \cdot G_x)\} / \{B_z \cdot (G_x^2 + G_y^2) + G_z \cdot (B_x \cdot G_x + B_y \cdot G_y)\}] \quad (13)$$

The following relationships, where $B_{xy} = (B_x^2 + B_y^2)^{0.5}$, and the angle $\phi$ is defined as (M−T), follow from the above and will be useful later:

$$B_{xy} \cdot \sin \phi = B_x \cdot \cos T - B_y \cdot \sin T = B \cdot \cos D \cdot \sin A \quad (14)$$

$$B_{xy} \cdot \cos \phi = B_x \cdot \sin T + B_y \cdot \cos T = B \cdot \cos D \cdot \cos I \cdot \cos A - B \cdot \sin D \cdot \sin I \quad (15)$$

Sensors are housed in a non-magnetic section of drill collars. However, it is possible for local drill collar magnetization to cause significant magnetic anomalies. For example, such magnetization might arise as a result of welding procedures on the drill collar, inadequate demagnetization applied to the collar or its contents, or the presence of magnetic "junk" attached to the outside of the collar. Anomalies of this kind appear as biases on the $B_x$, $B_y$, and $B_z$ measurements, and therefore lead to corrupted computations of M, B, D and A if equations (10) through (13) are applied. This invention therefore discloses a non-iterative method for reducing the influence of biased $B_x$ and $B_y$ readings on the computed value of A.

Beyond the non-magnetic section, the ends of adjacent magnetic drill collar sections may tend to act as magnetic poles, causing an additional magnetic anomaly in a direction approximately parallel to the z-axis. This type of anomaly will therefore appear primarily as a bias on the $B_z$ measurement, and will tend to corrupt the values of B, D, and A computed using equations (11) through (13). This invention therefore further discloses a non-iterative method for computing A without the use of the biased $B_z$ reading.

Figure 4A:
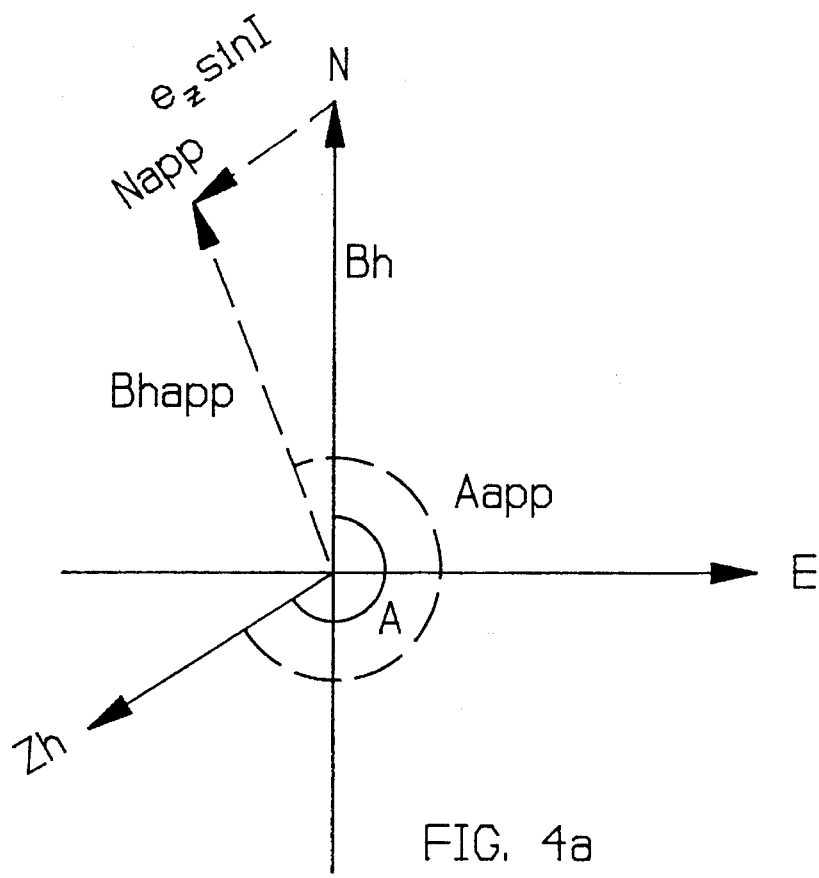
FIGS. 4a and 4b provide a graphical depiction of the impact of an axial magnetic biasing error component ($e_z$) upon the measurement and calculation of wellbore azimuth.
Figure 4B:
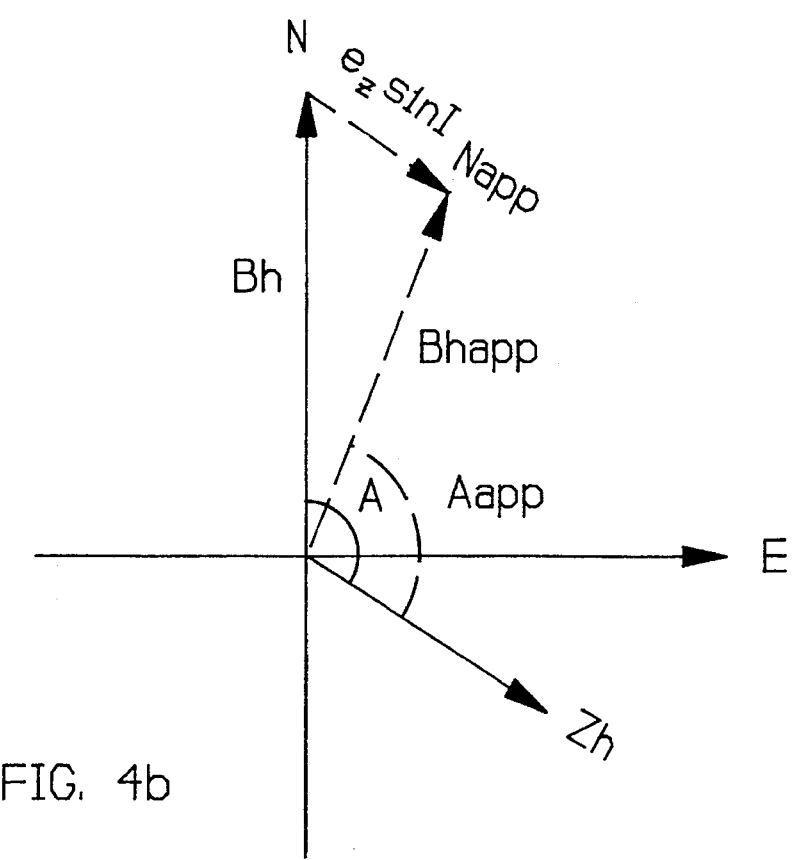

FIGS. 4a and 4b graphically depict the effects of an axial magnetic field bias "$e_z$" on the determination of azimuth A. In these figures, the horizontal component of the magnetic field is represented by "$B_h$"; the effect of axial bias makes the horizontal component of the magnetic field appear to be in the position of vector $B_{happ}$, which is representative of the "apparent horizontal component of the magnetic field". Azimuth A is defined with respect to the horizontal component of the z-axis $Z_h$. In these figures the apparent azimuth $A_{app}$ is the azimuth value determined from $B_{happ}$, and differs from the unbiased azimuth A. As is shown in FIGS. 4a and 4b, the effect of the axial error field $e_z$ is usually to increase apparent azimuth $A_{app}$ if the hole has a westward component as is shown in FIG. 4a, or to decrease apparent azimuth $A_{app}$ if the hole is eastbound, as is shown in FIG. 4b. In either case, the apparent bottomhole location is moved further north. This is the typical case for boreholes located in the northern hemisphere. When undesired magnetization is present, magnetometer and accelerometer readings provide apparent values for the horizontal component of the magnetic field $B_{happ}$ and azimuth $A_{app}$, but we wish to find the unbiased horizontal component of the magnetic field $B_h$ and especially the unbiased azimuth A.

The invention consists of (1) a method to reduce the influence of transverse magnetometer biases "$e_{xy}$", and (2) a method to compute azimuth A in the presence of axial magnetometer bias "$e_z$". These two techniques will now be described in turn.

Reduction of transverse magnetometer biases

The effects on computed azimuth of transverse magnetometer biases $e_x$ and $e_y$ may be reduced by taking a number of surveys as the tool is rotated through various tool face attitudes. As suggested by (14) and (15), the transverse magnetometer information is contained in the two parameters $B_{xy}$ and $\phi$, each of which remains invariant during such rotation. This invention uses a least-squares technique to best fit two or more points to the criteria that $e_x$, $e_y$, $B_{xy}$ and $\phi$ should remain invariant during rotation.

Figure 5:
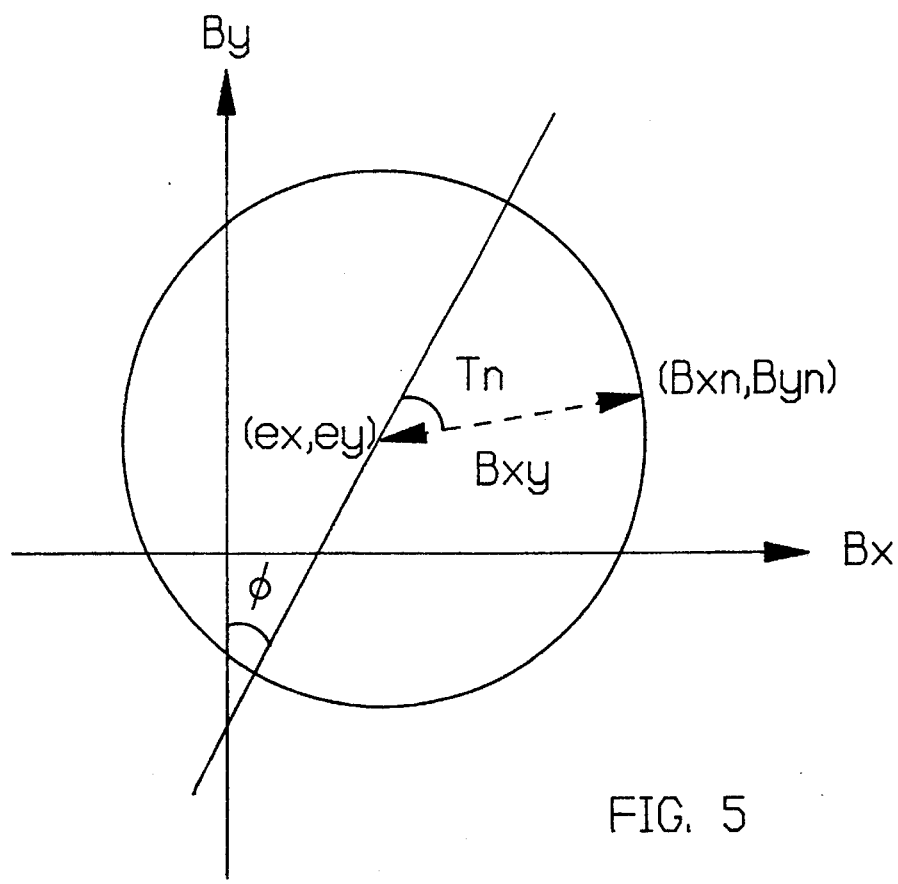
FIG. 5 is a graph which is utilized to describe the technique of the present invention for calculating wellbore orientation indicators which are independent of a transverse magnetic field biasing error.

FIG. 5 illustrates typical measured values of $B_x$ and $B_y$ at a number of different tool face attitudes "$T_n$". The points $(B_{xn}, B_{yn})$ represent the $n^{th}$ measurement, which is expected to have coordinates $$[e_x + B_{xy} \cdot \sin(T_n + \phi), \; e_y + B_{xy} \cdot \cos(T_n + \phi)] \tag{16}$$

However, its actual coordinates are measured by the tool as $(B_{xn}, B_{yn})$. Any difference is caused by measurement errors other than the systematic biases $e_x$ and $e_y$. The squared distance between the expected and measured coordinates is $$D_n^2 = [B_{xn} - e_x - B_{xy} \sin(T_n+\phi)]^2 + [B_{yn} - e_y - B_{xy} \cos(T_n+\phi)]^2 \tag{17}$$

This invention defines the most likely values of $e_x$, $e_y$, $B_{xy}$, and $\phi$ as those which minimize the sum of these squared distances over all N surveys. Minimization is obtained by setting the appropriate derivatives of equation (17) to zero; the results of this minimization are:

$$e_x = [\Sigma B_x - (b/c) \cdot \Sigma G_x - (a/c) \cdot \Sigma G_y]/N \tag{18}$$

$$e_y = [\Sigma B_y + (a/c) \cdot \Sigma G_x - (b/c) \cdot \Sigma G_y]/N \tag{19}$$

$$B_{xy} = [(a^2+b^2) \cdot (\Sigma G_x^2 + \Sigma G_y^2)/N]^{0.5}/c \tag{20}$$

$$\phi = \tan^{-1}(a/b) \tag{21}$$

where $$a = N \cdot \Sigma(B_x G_y) - \Sigma B_x \cdot \Sigma G_y - N \cdot \Sigma(B_y G_x) + \Sigma B_y \cdot \Sigma G_x \tag{22}$$

$$b = N \cdot \Sigma(B_x G_x) - \Sigma B_x \cdot \Sigma G_x + N \cdot \Sigma(B_y G_y) - \Sigma b_y \cdot \Sigma G_y \tag{23}$$

$$c = N \cdot \Sigma G_x^2 + N \cdot \Sigma G_y^2 - \Sigma^2 G_y \tag{24}$$

and "$\Sigma$" represents summation over all surveys.

The values of $B_{xy}$ and $\phi$ obtained from equations (20) and (21) are uncontaminated by the biases $e_x$ and $e_y$. Given a reliable measurement of $B_z$, equations (6), (14) and (15) can now be solved for B, D and A, the result for the azimuth A, magnetic field B, and dip angle D being:

$$A = \tan^{-1}[B_x \cdot \sin\phi/(B_{xy} \cdot \cos\phi \cdot \cos I + B_z \cdot \sin I)] \tag{25}$$

$$B = (B_2 + B_z^2)^{0.5} \tag{26}$$

$$D = \sin^{-1}[(B_z \cdot \cos I - B_{xy} \cdot \cos\phi \cdot \sin I)/B] \tag{27}$$

However, these expressions are of limited value, since experience has shown that the z-axis bias "$e_z$" usually outweighs the transverse biases $e_x$, $e_y$; hence if it is necessary to reduce the influence of $e_x$ and $e_y$ as above, the measurement of $B_z$ in (6) will probably also have been corrupted by an axial bias $e_z$. The second part of this invention therefore discloses a non-iterative method for computing azimuth A without the use of the $B_z$ measurement.

Computation of A in the presence of axial magnetometer bias

Figure 6:
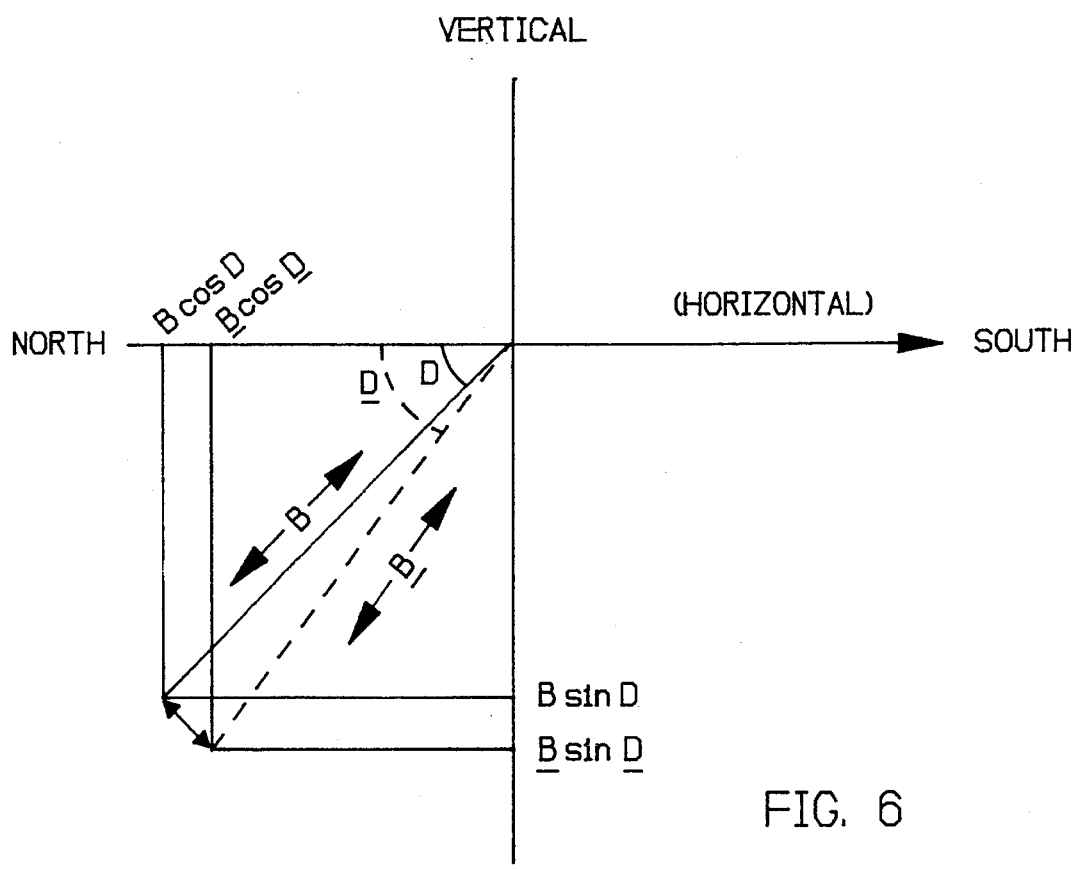
FIG. 6 is a graphical depiction of a minimization criterion which is employed to calculate wellbore orientation indicators which are independent of any axial magnetic field biasing error component.

If the $B_z$ measurement is corrupted, equation (6) is not useful in computing the azimuth A. Instead, A can be calculated from (4) and (5), or from (14) and (15), and from the estimated local magnetic field defined by the expected values $\underline{B}$ and $\underline{D}$. The expected values $\underline{B}$ and $\underline{D}$ can be established for a particular latitude and longitude from look up tables, charts or computer programs. The invention disclosed here makes use of both $\underline{B}$ and $\underline{D}$, by minimizing the vector distance between B and its expected value $\underline{B}$. As shown in FIG. 6, this can be expressed mathematically by adding a third equation $$(\underline{B} \cdot \cos\underline{D} - B \cdot \cos D)^2 + (\underline{B} \cdot \sin\underline{D} - B \cdot \sin D)^2 = \text{minimum}, \tag{28}$$

and solving the three equations (14), (15), and (28), for the three unknowns B, D and A. This is accomplished by using (14) and (15) to express $B \cdot \sin D$ and $B \cdot \cos D$ in terms of $\sin A$ and $\cos A$, then taking the derivative of (28) with respect to A and setting it to zero. This yields the equation $$X \cdot \sin A + Y \cdot \cos A + Z \cdot \sin A \cdot \cos A = 0 \tag{29}$$

where $X = (B_{xy} \cos\phi + \underline{B} \cdot \sin\underline{D} \cdot \sin I) \cdot \cos I$ \hfill (30)

$Y = -B_{xy} \cdot \sin\phi$ \hfill (31)

and $Z = \underline{B} \cdot \cos\underline{D} \cdot \sin^2 I$ \hfill (32)

A variety of iterative procedures may be employed to solve this type of equation. However, the non-iterative method disclosed here makes use of the substitution $\sin A = (1 - \cos^2 A)^{0.5}$ in (29), to obtain the following fourth-order equation in $\cos A$:

$$\cos^4 A + 2 \cdot X/Z \cdot \cos^3 A + (X^2 + Y^2 - Z^2)/Z^2 \cdot \cos^2 A - 2X/Z \cdot \cos A - X^2/Z^2 = 0 \tag{33}$$

[Although equation (33) can be equally well cast in terms of $\sin A$ or $\tan A$; the equivalent equations are:

$$\sin^4 A + 2 \cdot Y/Z \cdot \sin^3 A + (X^2 + Y^2 - Z^2)/Z^2 \sin^2 A - 2 \cdot Y/Z \cdot \sin A - Y^2/Z^2 = 0$$

$$\tan^4 A + 2 \cdot Y/X \cdot \tan^3 A + (X^2 + Y^2 - Z^2)/X^2 \cdot \tan^2 A + 2 \cdot Y/X \cdot \tan A + Y^2/X^2 = 0$$

There may actually be numerical advantages to solving for $\sin A$ in many cases, since in the critical east-west orientations $|\sin A|$ approaches 1 while $\cos A$ approaches zero.]

This equation is solved by the method of radicals, well known in mathematical literature, to obtain either two or four real roots in $\cos A$. The method of radicals is most fully described in the following reference: "College Algebra" by J. B. Rosenbach, E. A. Whitman, B. E. Meserve, and P.M. Whitman, Fourth Edition, Ginn & Co., 1958, pp. 366–367, which is incorporated herein fully as if set forth. For each of the real roots in $\cos A$, $\sin A$ is obtained from equation (29), and the root which gives the minimum value of equation (28) is assumed to be the correct one.

This method can also be used to correct for a bias on $B_z$ without first reducing the influence of transverse biases; one need only take a single survey and obtain $B_{xy}$ and $\phi$ from (14) and (15) instead of from (20) and (21). This is equivalent to solving (4), (5) and (28) for the unknowns B, D and A.

After an unbiased azimuth A is computed, magnetic field strength B and dip angle D can be computed as follows:

$$B = B_{xy} \cdot [(\sin\phi/\sin A)^2 + \{(\sin\phi \cdot \cos I/\tan A - \cos\phi)/\sin I\}^2]^{0.5} \tag{34}$$

$$D = \sin^{-1}[B_{xy} \cdot (\sin\phi \cdot \cos I/\tan A - \cos\phi)/(B \cdot \sin I)] \tag{35}$$

Preferably, the techniques of the present invention are utilized in conventional wellbore surveying operations. Typically, the sensor array is located within the bottomhole assembly of a drillstring during drilling operations. During pauses in the drilling activity, the sensors are utilized to detect the x-axis, y-axis, and z-axis components of the earth's magnetic and gravitational field vectors, but the z-axis component of the magnetic field is assumed to be corrupted and is thus primarily used as a quality check since $e_z$ should not change rapidly between surveys. These measurements include the influence of the magnetic field biasing error components including the axial magnetic field biasing error component $e_z$ and the transverse magnetic field biasing error component $e_{xy}$. As is conventional, the measurements are transmitted to the earth's surface utilizing measurement-while-drilling data transmission techniques. Typically, the data is impressed upon a mud column as a series of pressure drops or increases which are decoded at the surface to provide numerical data. This data may be entered into a computing device which is preprogrammed in accordance with the method of the present invention. The program will include as inputs the x-axis, y-axis, and z-axis components of the earth's magnetic and gravitational field vectors. The calculations are performed in accordance with the description provided hereabove, and the program provides as an output the wellbore's azimuth A and inclination I which are so useful in defining the position of a wellbore relative to the earth's magnetic and gravitational field vectors.

While the invention has been shown in only one of its forms, it is not thus limited but is susceptible to various changes and modifications without departing from the spirit thereof.

What is claimed is:

1. A method of surveying a wellbore utilizing a sensor array located within a drillstring within said wellbore, comprising:

measuring magnetic and gravitational fields with said sensor array at a particular depth and at a particular tool face orientation;

angularly displacing said drillstring to at least one other tool face orientation and measuring magnetic and gravitational fields with said sensor array at that particular tool face orientation thus providing measurements from a plurality of tool face orientations;

utilizing measurements of said magnetic and gravitational fields to calculate directly, algebraically, and non-iteratively at least one wellbore orientation indicator, which is responsive to wellbore orientation and which is free of transverse magnetic field biasing error by deriving a value for said at least one wellbore orientation indicator from said measurements from a plurality of tool face orientations which satisfies an analysis requirement that said transverse magnetic field biasing error remain invariant as said drillstring is rotated.

2. A method of surveying a wellbore according to claim 1, wherein, during said step of utilizing measurements of said magnetic and gravitational fields, a value for said at least one wellbore orientation indicator is calculated utilizing a statistical analysis of a plurality of measurements at differing tool face angles.

3. A method of surveying a wellbore according to claim 1, wherein, during said step of utilizing measurement of said magnetic and gravitational fields, wellbore azimuth is calculated, through simultaneous use of measurements of magnetic and gravitational fields, in a manner which minimizes the influence of magnetic interference.

4. A method of surveying a wellbore according to claim 1, wherein during said step of utilizing measurements of said magnetic and gravitational field, said at least one wellbore orientation indicator is calculated utilizing measurements of said magnetic and gravitational fields from only two tool face orientations.

5. A method according to claim 4, wherein said at least one wellbore orientation indicator comprises wellbore azimuth.

6. A method of surveying a wellbore utilizing a sensor array located within a drillstring within said wellbore, comprising:

measuring magnetic and gravitational fields with said sensor array at a particular depth and at a particular tool face orientation;

angularly displacing said drillstring to at least one other tool face orientation and measuring magnetic and gravitational fields with said sensor array at that particular tool face orientation thus providing measurements from a plurality of tool face orientations;

utilizing measurements of said magnetic and gravitational fields to calculate directly and algebraically at least one wellbore orientation indicator, which establishes wellbore orientation and which is free of at least a transverse component of a magnetic field biasing error, by performing a plurality of intermediate calculations, including:

(a) for all tool face orientations, performing a statistical error-minimizing operation;

(b) utilizing results of said statistical error-minimizing operation to directly and algebraically calculate said at least one wellbore orientation indicator which is uninfluenced by said at least one component of said magnetic field biasing error by deriving a value for said at least one wellbore orientation indicator from said measurements from a plurality of tool face orientations which satisfies an analysis requirement that said transverse magnetic field biasing error remain invariant as said drillstring is rotated.

7. A method of surveying a wellbore according to claim 6:

wherein said at least one wellbore orientation indicator comprises wellbore azimuth; and wherein wellbore azimuth is directly and algebraically calculated in a manner which renders the result independent of at least a transverse component of said magnetic field biasing error.

8. A method of surveying a wellbore according to claim 6, wherein said plurality of intermediate calculations include:

(c) utilizing (a) results of said statistical error-minimizing operation, and (b) a provided measure of an axial component of said magnetic field biasing error, to directly and algebraically calculate said at least one wellbore orientation indicator which is uninfluenced by of said magnetic field biasing error.

9. A method of surveying a wellbore utilizing a sensor array located within a drillstring within said wellbore, comprising:

measuring magnetic and gravitational fields with said sensor array at a particular depth and at a particular tool face orientation;

angularly displacing said drillstring to at least one other tool face orientation and measuring magnetic and gravitational fields with said sensor array at that particular tool face orientation thus providing measurements from a plurality of tool face orientations;

utilizing measurements of said magnetic and gravitational fields to calculate directly and algebraically a wellbore azimuth at said particular depth, which is free of at least one component of magnetic field biasing errors, by performing a plurality of intermediate calculations, including:

(a) performing a method-of-least-squares estimation calculation utilizing (a) said plurality of measurements of said magnetic and gravitational fields and (b) at least one magnetic field parameter, to identify the most likely values for said at least one magnetic field parameter by deriving a value for said wellbore azimuth from said measurements from a plurality of tool face orientations which satisfies an analysis requirement that said transverse magnetic field biasing error remain invariant as said drillstring is rotated; and (b) directly calculating an uncorrupted wellbore azimuth utilizing said most likely values of said at least one magnetic field parameter.

10. A method of surveying a wellbore utilizing a sensor array located within a drillstring within said wellbore in the presence of a magnetic field biasing error which can be defined in terms of (1) an axial magnetic field biasing error, and (2) a transverse magnetic field biasing error, comprising:

measuring magnetic and gravitational fields with said sensor array at a particular depth and at a particular tool face orientation;

rotating said drillstring to at least one other tool face orientation and measuring magnetic and gravitational fields with said sensor array at that particular tool face orientation thus providing measurements from a plurality of tool face orientations;

utilizing measurements of said magnetic and gravitational fields to calculate directly, algebraically, and non-iteratively wellbore azimuth in a manner which reduces the influence of said magnetic field biasing error by deriving a value for said wellbore azimuth from said measurements from a plurality of tool face orientations which satisfies an analysis requirement that said transverse magnetic field biasing error remain invariant as said drillstring is rotated.

11. A method of surveying a wellbore utilizing a sensor array located within a drillstring within said wellbore, comprising:

measuring magnetic and gravitational fields with said sensor array at a particular depth and at a plurality of particular tool face orientations;

utilizing measurements of said magnetic and gravitational fields to calculate directly, algebraically, and non-iteratively at least one wellbore orientation indicator, which is free of magnetic field biasing errors, by performing intermediate calculations, including:

comparing measurements of said magnetic field with expected values for said magnetic field in a manner which minimizes the difference between a calculated value for said magnetic field and an expected value for magnetic field and which includes the following steps:

identifying a most likely value for said at least one wellbore orientation indicator by:
(a) comparing measured magnetic field vector magnitude to expected magnetic field vector magnitude;
(b) comparing measured dip angle values to expected dip angle values; and
(c) determining a most likely value for said least one wellbore orientation indicator by identification of minimum variation between measured and expected values.

12. A method of surveying a wellbore utilizing a sensor array located within a drillstring within said wellbore, comprising:

measuring magnetic and gravitational fields with said sensor array at a particular depth and at a plurality of particular tool face orientations;

utilizing measurements of said magnetic and gravitational fields to calculate directly, algebraically, and non-iteratively wellbore azimuth in a manner which minimizes the corrupting influence of axial magnetic field biasing errors, by performing intermediate calculations, including:

comparing measurements of said magnetic field with expected values for said magnetic field in a manner which minimizes the difference between a calculated value for a magnetic field vector and an expected value for said magnetic field vector, and which include the following steps:

identifying a most likely value for said at least one wellbore orientation indicator by:
(a) comparing measured magnetic field vector magnitude to expected magnetic field vector magnitude;
(b) comparing measured dip angle values to expected dip angle values; and
(c) determining a most likely value for said at least one wellbore orientation indicator by identification of minimum variation between measured and expected values.

* * * * *